United States Patent [19]

Deschenes et al.

[11] 3,863,248

[45] Jan. 28, 1975

[54] DIGITAL COMPRESSOR-EXPANDER

[75] Inventors: Pierre A. Deschenes, Sherbrooke; Hubert Stephenne, Rock Forest; Michel Villeret, Sherbrooke, Quebec, all of Canada

[73] Assignee: Universite de Sherbrooke, Sherbrooke, Quebec, Canada

[22] Filed: Jan. 2, 1973

[21] Appl. No.: 320,565

[52] U.S. Cl. .......... 340/347 DD, 235/154
[51] Int. Cl. .......... H03k 13/00
[58] Field of Search .......... 340/347 DD; 235/154

[56] References Cited

UNITED STATES PATENTS

| | | | |
|---|---|---|---|
| 3,526,759 | 9/1970 | Clapper | 340/347 DD |
| 3,594,560 | 7/1971 | Stanley | 340/347 DD |
| 3,694,639 | 9/1972 | Deschenes et al. | 340/347 DD |
| 3,755,808 | 8/1973 | Candiani | 340/347 DD |

OTHER PUBLICATIONS

Transmission Systems for Communications, Bell Telephone Laboratories, Fourth Edition, Feb. 1970, pp. 574–585, Prepared by Western Electric Co, Inc., Tech. Publications.

*Primary Examiner*—Malcolm A. Morrison
*Assistant Examiner*—Errol A. Krass
*Attorney, Agent, or Firm*—Raymond A. Robic; David A. Blumenthal; Arthur Schwartz

[57] ABSTRACT

A compressor-expander for converting m digit coded signals into $n$ digit coded signals according to a desired input-output continuous characteristic. The compressor comprises first means for converting the m digit coded signals into $p$ digit coded signals, $p<m$, so that when the corresponding analog values $x$ of the $m$ digit coded signals are plotted on the X axis and the corresponding analog values $y$ of the $p$ digit coded signals plotted on the Y axis of a Cartesian coordinate system, they produce an input-output discontinuous characteristic composed of a plurality of successive straight line segments of different slopes, and second means responsive to the first means for converting the $p$ digit coded signals into such $n$ digit coded signals as determined by the desired input-output continuous characteristic.

18 Claims, 7 Drawing Figures

DIGITAL COMPRESSOR-EXPANDER

This invention relates to a compressor-expander, and more particularly to a compressor-expander for use in converting a $m$ digit coded signal into a $n$ digit coded signal according to an input-output characteristic of the continuous type.

PCM modulation is a method of coding analog signals into binary signals. In accordance with such method, an analog signal is sampled and the amplitude of each sample is coded using a binary code. To transmit voice signals, the amplitude of the sample is normally compressed in order to reduce the number of digits in the code. Such a compression may be done on the voice signal before coding (analog compression), during coding by non-linear coders, or after coding (digital compression). Of course, the compressed signal must be expanded to its original number of digits at the receiving end of the line.

The present invention is concerned with digital compressors or expanders which use various compression or expansion laws for reducing or increasing respectively the number of digits in a code. Some of these laws are represented by continuous logarithmic curves. Others by discontinuous curves made of a plurality of successive straight line segments such as the ones known in the art as the $\mu = 255$ or $A = 87.6$ laws. Such laws are disclosed in the publication "Transmission Systems for Communications" published by Western Electric Co. Inc. Technical Publications December 1971. Generally the discontinuous curves are chosen so as to permit the design of simple digital circuits for the conversion. However, the continuous laws are difficult to reproduce by means of digital circuits.

It is therefore the object of the present invention to simplify the design of digital compressors-expanders which are defined by continuous compression laws. The proposed apparatus is less costly than the known systems and introduce less distortion in the signal. In addition, it may be used with any known and future continous compression laws, even those that may not be expressed by mathematical equations.

A sample represented by a number m of digits, for example 11 to 14 digits, may only take a discrete number of digital values ($2^{11}$ to $2^{14}$). Consequently, it would be theoretically possible to design a conversion table permitting to transform such values into corresponding "compressed" digital values and to effect such conversion by means of well-known read only memories (ROM). Indeed, each discrete value of the signal may be allotted a distinct memory unit in the ROM memory and the "compressed" digital value written into each memory unit. Thus, for each input signal fed to the ROM memory may be read the corresponding "compressed" output value. However, this solution is not economic because of the great number of memory units required (between $2^{11}$ to $2^{14}$).

The compressor, in accordance with the invention, overcomes the above drawback by providing a first means for converting the $m$ digit coded signals into $p$ digit coded signals so that when the corresponding analog values $x$ of the m digit coded signals are plotted on the X axis and the corresponding analog values $y$ of the $p$ digit coded signals plotted on the Y axis of a Cartesian coordinate system, they produce an input-output discontinuous characteristic composed of a plurality of successive straight line segments of different slopes.

Such first means thus converts the $m$ digit coded signals into $p$ digit coded signals in the same manner as the above-mentioned input-output discontinuous characteristic of the $\mu = 255$ or of the $A = 87.6$ type. The output of the first means is connected to a second means for converting the $p$ digit signals into $n$ digit coded signals according to the desired input-output continuous characteristic.

The first means may include a shift register capable of storing the $m$ digit coded signals, gate means for transferring the $m$ digit coded signals into the shift register, means for detecting the most significant digits of the $m$ digit coded signals which are indicative of the line segment to which the $m$ digit coded signals belong, means for isolating the less significant digits of higher order which are indicative of the points on such line segment corresponding approximatively to the $m$ digit coded signals, and a counter responsive to the detecting means for identifying the line segment. The digits stored in the counter and the less significant digits of higher order are fed to the second means.

The second means may be a ROM memory of the type mentioned above but it will be easily understood that since the number of digits of the coded signals has been greatly reduce by the first means, the capacity of the ROM memory is much lower, thus representing a great saving in the cost of the memory.

The expander is built on the same principle as the compressor. The n digit coded signal is first translated by a ROM memory into a form permitting to translate it back to the m digit coded signal following an input-output discontinuous characteristic made of a plurality of successive straight line segments.

The expander may include a shift register into which is stored the output of the ROM memory, a step-down counter adapted to detect the most significant digits of the ROM memory which are indicative of the line segment to which the coded signal of the ROM memory belongs, and gate means responsive to the stepdown counter for shifting the content of the shift register until the desired m digit coded signals appear at the output of the shift register.

The invention will now be disclosed, by way of example, with reference to preferred embodiments thereof and to the accompanying drawings in which.

Figures 2, 5:
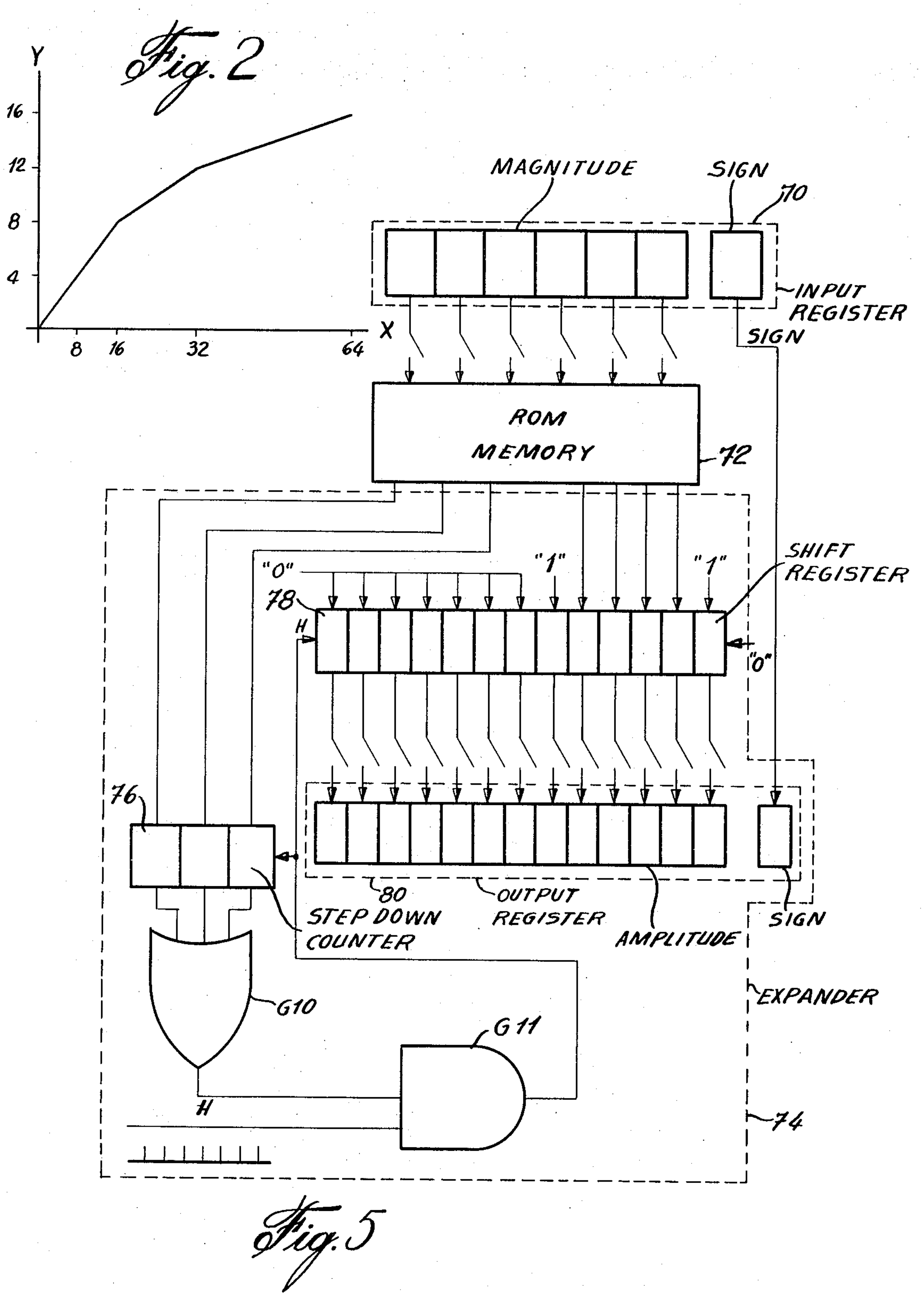
FIG. 2 illustrates the input-output discontinuous characteristic of the compressor of FIG. 1.
Figure 6:
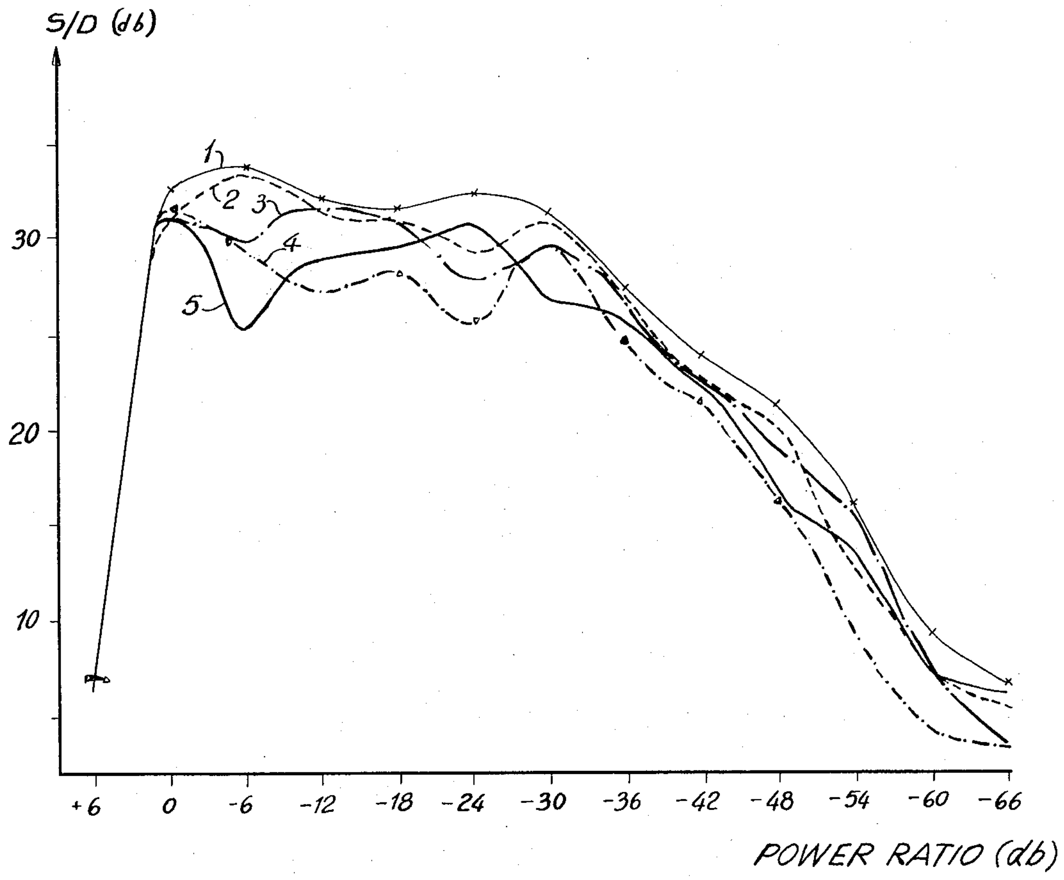
Figure 7:
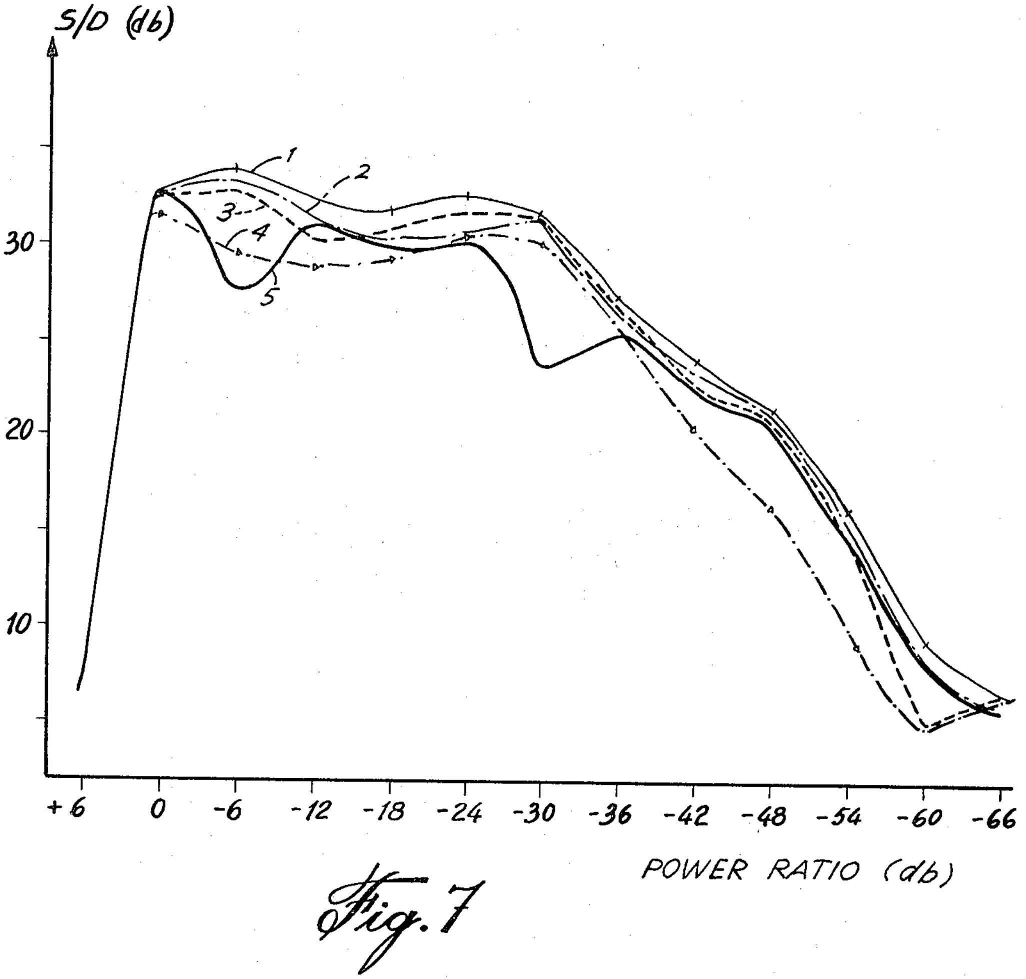

FIG. 5 illustrates a second embodiment of an expander in accordance with the invention; and FIGS. 6 and 7 illustrate signal to noise ratios obtained for the logarithmic law $\mu = 100$ when the laws $\mu = 255$ having 15 segments and $A = 87.6$ having 13 segments are used an intermediate step for obtaining the above logarithmic law $\mu = 100$.

Figure 1:
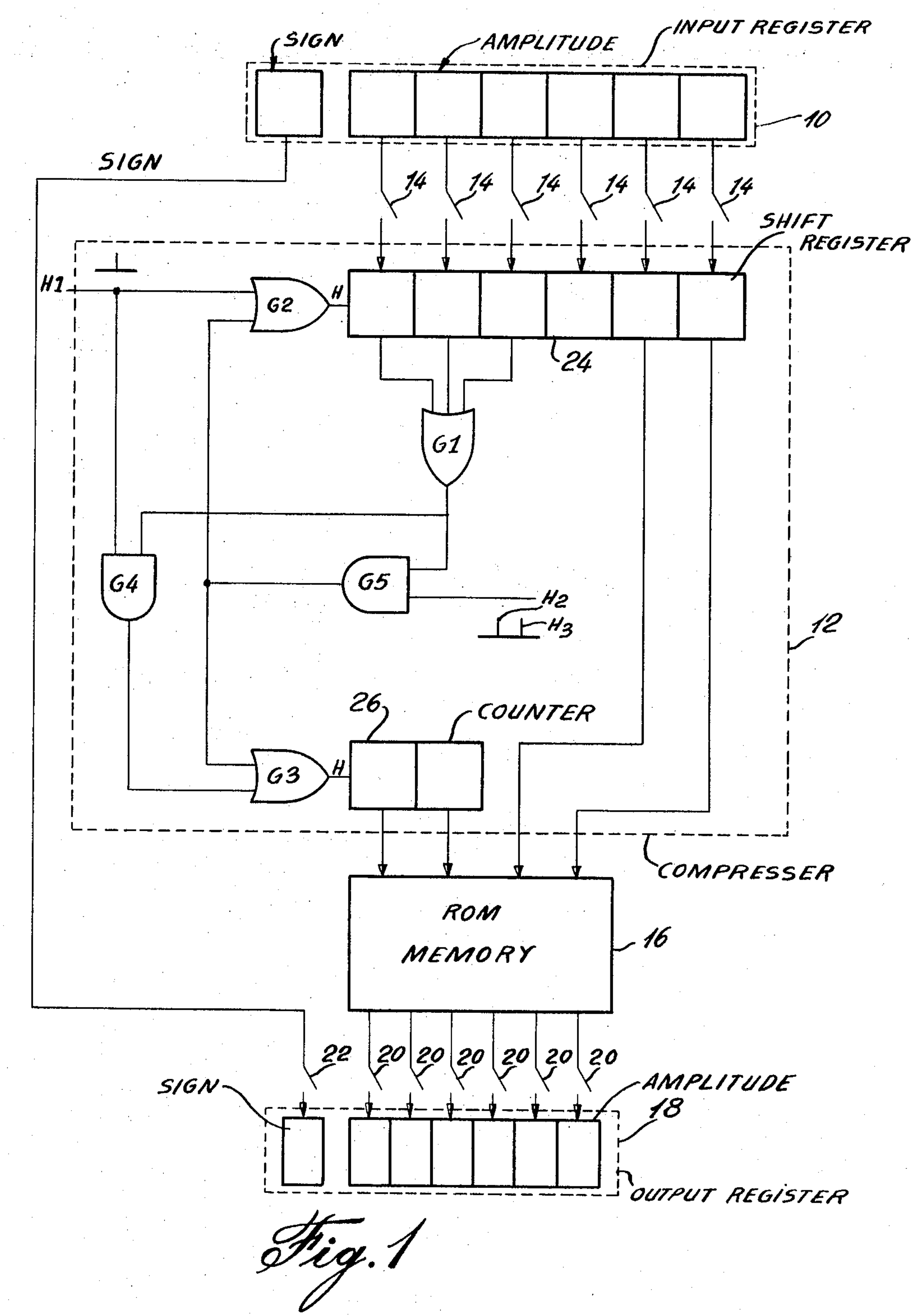
FIG. 1 illustrates a first example of a compressor in accordance with the invention.

Referring to FIG. 1, there is shown an embodiment of a compressor in accordance with the invention capable of satisfying the logarithmic equations:

$$f(x) = \ln(1+\mu x)/\ln(1+\mu)$$

wherein $\mu = 100$.

The compressor includes an input register 10 capable of storing a seven digit word consisting of six digits representing the amplitude of the word and one digit representing the sign. The six digits representing the amplitude of the word are fed to a compressor 12 capable of reducing the number of digits of the word to four digits following an input-output discontinuous characteristic made of plural successive straight line segments. The transfer of the digits from the input register to the shift register is controlled by gates 14 which, for simplification purposes, have been shown as switches. The output of the compressor 12 is fed to a conventional ROM memory 16 composed of $2^4$ or 16 memory units of six digits. Each memory unit has six bit permanently written into it corresponding to the output which would be obtained by a compressor of the continuous type. The output of the ROM memory 16 is fed to an output register 18 through gates 20. The sign of the input code is not affected by the compression and thus fed directly to the output register 18 through gate 22.

The compression law used by the compressor 12 for reducing the number of digits of the word may vary. However, such law is always chosen so as to permit to effect the transformation by simple digital circuits. The compression law of compressor 12 has been chosen as being very simple so as to permit to illustrate how a conversion from a six digit word to a four digit word is done. The result of the operation of the compressor 12 is illustrated in the following table:

TABLE 1

| LINEAR WORD | COMPRESSED |
|---|---|
| 1 w x a b c | 1 1 w x |
| 0 1 w x a b | 1 0 w x |
| 0 0 1 w x a | 0 1 w x |
| 0 0 0 w x a | 0 0 w x |

In such table, the input-output discontinuous characteristic will be made of four line segments having breakpoints at the second, third and fourth lines starting from the bottom of the table 1 as illustrated in FIG. 2. The conversion illustrated in the above table 1 is done by a circuit including a shift register 24, OR gates G1 to G3, AND gates G4 and G5, and up counter 26. In such a circuit, the counter 26 is used to indicate the straight line segment to which the sample belongs and the two bits *wx* are isolated by shifting these two bits to the right in the shift register while observing the position of the most significant digit 1.

If the word belongs to the first straight line segment (000*wxa*), the first three digits of the word stored into the shift register 24 will be 000. This combination will be detected by OR gate G1 but an output 0 will be fed to AND gates G4 and G5, thus maintaining such gates closed. The first clock pulse H1 will shift the register 24 to the right one step through OR gate G2 so as to move the digits wx in the last two slots of the register 24. The counter 26 will show 00 since AND gate G4 is not conductive. The following two clock pulses H2 and H3 will not affect the circuit since AND gate G5 is closed. The output fed to the ROM memory will thus be 00wx as shown in the table 1.

If the word belongs to the second straight line segment (001*wxa*), the first three digits 001 stored in the shift register 24 will be detected by OR gate G1 and the output thereof will open AND gates G4 and G5. The first clock pulse H1 will shift the register 24 to the right once through OR gate G2. In addition, the clock pulse H1 will pass through AND gate G4 and OR gate G3 to register 01 in the counter 26. The first three digits of the shift register 24 will thus become 000 and gate G5 will be blocked. Consequently, the following clock pulses H2 and H3 will have no effect and the output of the compressor will be 01*wx*.

If the word belongs to the third straight line segment (01*wxab*), the first two digits 01 will be detected by or gate G1 and render AND gates G4 and G5 conductive. The first clock pulse H1 will shift register 24 to the right once and cause counter 26 to register 01 through open AND gate G4 and OR gate G3. The combination appearing in the shift register 24 will then be 001 and AND gate 65 will still be conductive. Therefore, the clock pulse H2 will shift the register 24 once more through OR gate G2 and register 10 in counter 26 through OR gate G3. The first three digits of register 24 will therefore become 000 and AND gate G5 will be non-conductive. Therefore, the third clock pulse H3 will have no effect and the output of the compressor will then be 10*wx*.

If the word belongs to the fourth straight line segment (1), the digit 1 will be detected by OR gate G1 and render AND gate G4 and G5 conductive. The first, second and third clock pulses will successively shift the register 24 until the digits *wx* pass to the last two slots of the register. At the same time, the counter will count three times to show 11. The combination fed to the ROM memory will consequently be 11*wx* as shown in the above table.

The ROM memory required to convert the word compressed in accordance with an input-output discontinuous characteristic made of successive straight line segments through a word expressed in accordance with a continuous input-output characteristics such as the logarithmic law $\mu = 100$ will only be required to have a storing capacity of $2^4$ or 16 words of six bits. If a ROM memory alone had been used, its required capacity would have been $2^6$ or 64 words of six bits. It will therefore be appreciated that, even in the simple example given above, the size of the ROM memory is much reduced.

In order to obtain a higher value of signal to noise, a larger number of bits (for example 12 bits) must be used to code an analog signal. One could then use the well-known compression law $\mu = 255$ with seven or eight bits or the well-known compression law $A = 87.6$ as an intermediate step in the compressor 12 to perform a conversion following an input-output continuous characteristic such as the law $\mu = 100$. A conversion table based on the above law $\mu = 255$ (eight bits) is shown in the following table:

TABLE 2

| LINEAR WORD (+33) | COMPRESSED WORD |
|---|---|
| 1 w x y z a b c d e f g h | 1 1 1 w x y z |
| 0 1 w x y z a b c d e f g | 1 1 0 w x y z |
| 0 0 1 w x y z a b c d e f | 1 0 1 w x y z |
| 0 0 0 1 w x y z a b c d e | 1 0 0 w x y z |
| 0 0 0 0 1 w x y z a b c d | 0 1 1 w x y z |
| 0 0 0 0 0 1 w x y z a b c | 0 1 0 w x y z |
| 0 0 0 0 0 0 1 w x y z a b | 0 0 1 w x y z |
| 0 0 0 0 0 0 0 1 w x y z a | 0 0 0 w x y z |

Figure 3:
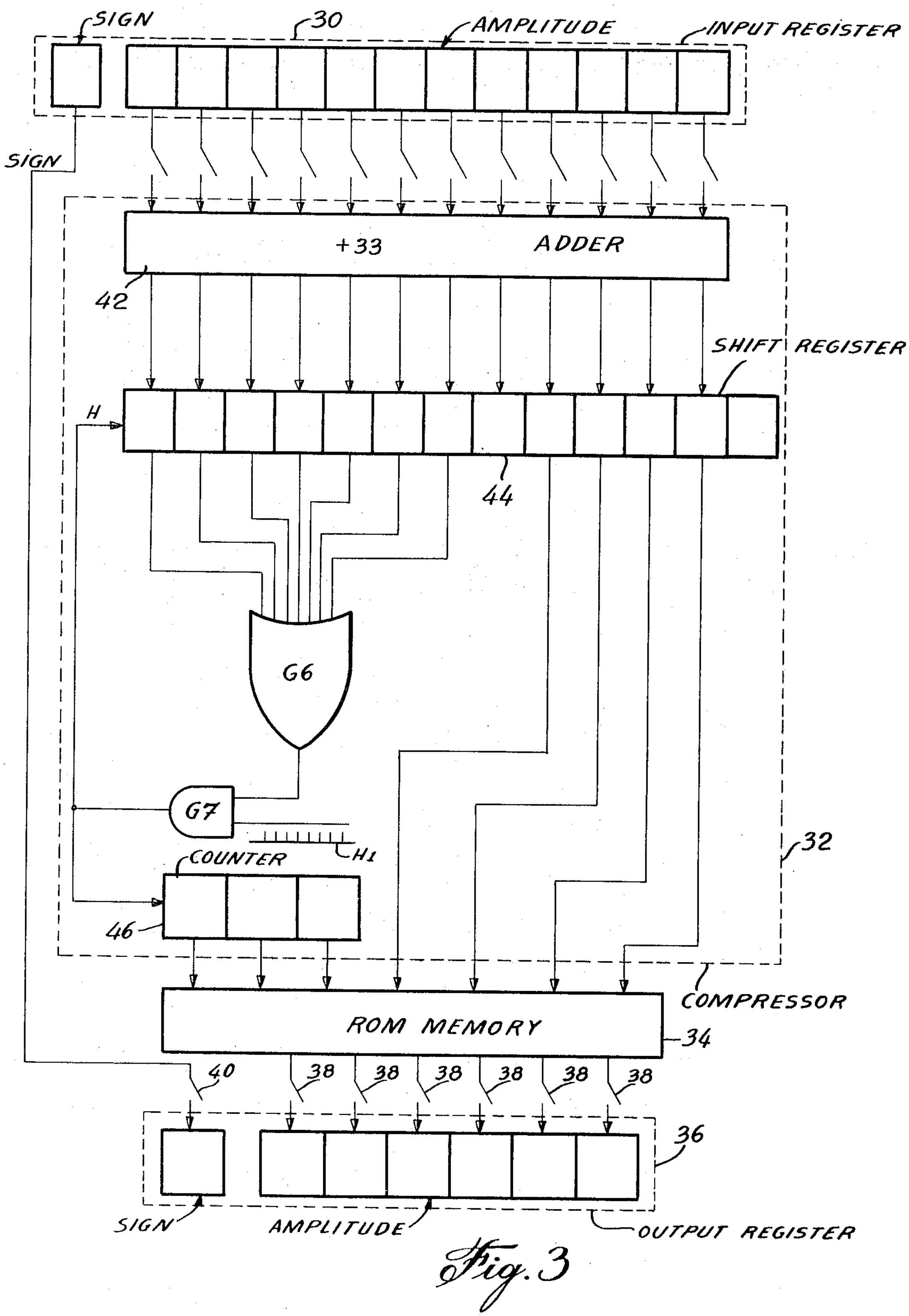
FIG. 3 illustrates a second embodiment of a compressor in accordance with the invention.
Figure 4:
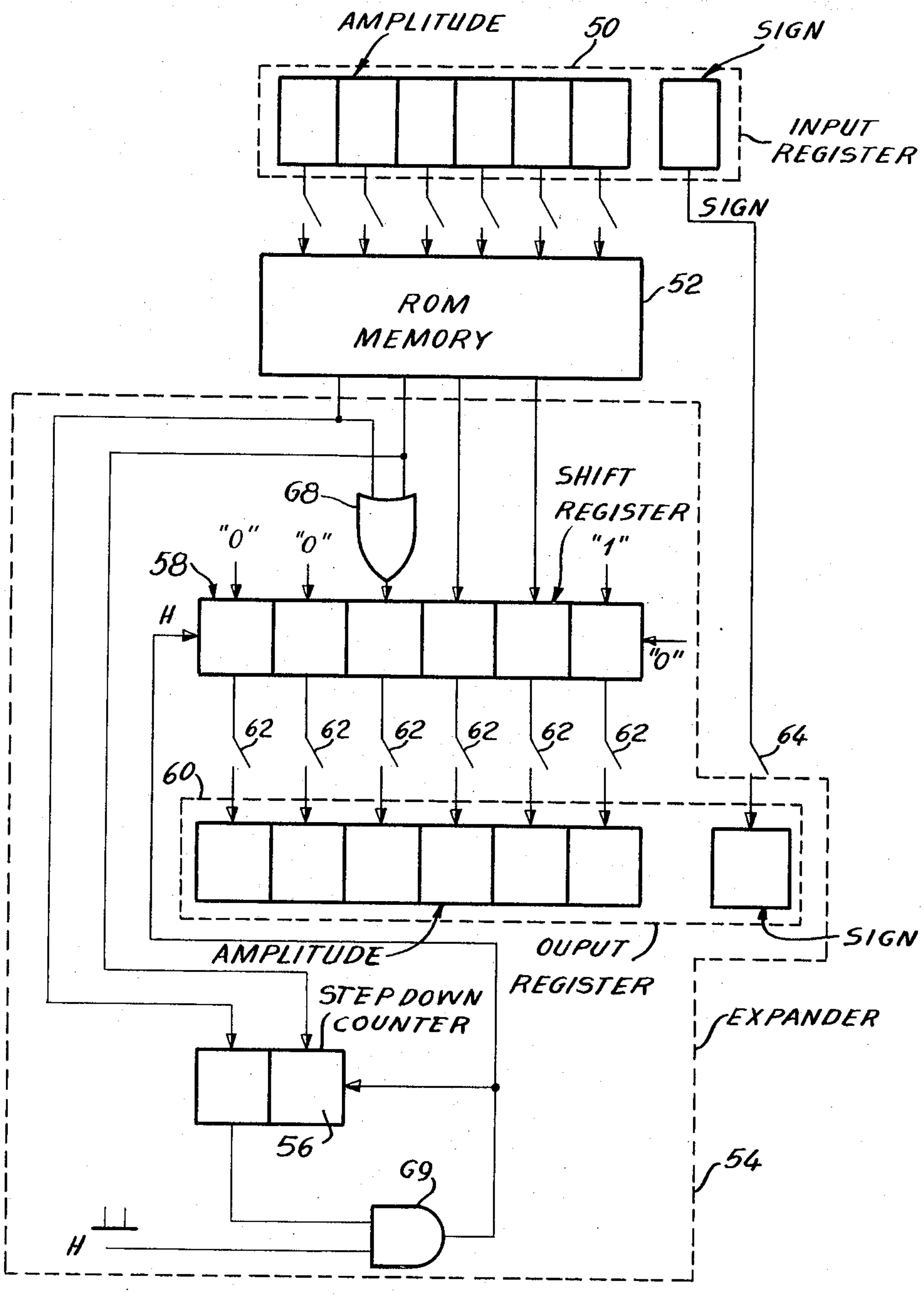
FIG. 4 illustrates an embodiment of an expander in accordance with the invention.

A circuit for performing the above conversion is shown in FIG. 3 and is similar to the one of FIG. 1. It includes an input register 30 capable of storing a word having 12 digits of amplitude plus one digit for the sign. The amplitude digits stored in the input register are fed to a compressor 32 capable of reducing the number of digits of the word to seven digits following an input-output discontinuous characteristic having eighth segments (15 segments if the negative portion of the analog signal is considered). The output of the compressor 32 is fed to a conventional ROM memory capable of storing $w^7$ or 128 words of six bits. Each word is stored in a memory unit capable of storing six bits because, in the example shown, it is desired to convert the thirteen bit word into a six bit word according to an input-output continuous characteristic following the law $\mu = 100$.

The output ROM memory 34 is fed to output register 36 through gates 38. As in FIG. 1, the sign is fed directly to the output register 36 through gate 40 since it is not affected by the compression.

The compressor 32 is similar to the corresponding compressor 12 of FIG. 1 except that it is provided with an added 42 for adding 33 to the word stored in the input register. This is done in the well-known law $\mu = 255$ to permit the input-output discontinuous characteristic made of successive line segments to more closely follow the logarithmic equations:

$$f(x) = \ln (1+\mu x)/\ln (1+\mu)$$

In operation, the detection of a word belonging to the first line segment (00000001) is performed by OR gate G6 and, since the inputs of the gate G are all 0, the AND gate G7 will be non-conductive. Consequently, the shift register 44 will not move and the counter will indicate 000. The word transferred into the ROM memory will thus be 000*wxyz* as indicated in the above table 2.

If a word belonging to the second line segment (0000001*wxyzab*) is detected by OR gate G6, a digit 1 will be fed to AND gate G7 to render such AND gate conductive. Consequently, the first clock pulse H1 will shift the register 44 once and move the counter to indicate 001. There will be no further shift of the register because the inputs of gate G6 will then be all 0. Consequently, the word fed to the ROM memory will be 001*wxyz* as indicated in the above table 2.

The above operation will be followed for any word fed to the shift register and it appears to be unnecessary to disclose the operation of the shift register for each type of words.

As commonly known, the signal compressed at one end of the line must be expanded back to its original state at the other end of the line. The expansion is done by following the same principle as the compression. If expansion was done directly using a ROM memory for converting a six digit word into a thirteen digit word, the ROM memory would require $2^6$ or 64 memory units of thirteen bits to store the above words. Such a memory will be too expensive and it is therefore proposed to use a smaller ROM memory capable of storing 64 words of a lower number of bits and to subsequently convert such word into a word of thirteen bits using an input-output discontinuous characteristic made up of plural successive straight line segments.

An expander is illustrated in FIG. 5 of the drawings. Such an expander is designed to expand the word previously compressed according to the compression law of FIG. 1 and includes an input register 50, a ROM memory 52 and an expander 54. The word stored in input register 50 has six digits representing its amplitude plus one additional digit representing its sign. The amplitude of the word stored in register 50 is fed to ROM memory 52 which transforms it to a four digit word. The memory thus requires $2^6$ or 64 memory units each capable of storing four bits. The output of the ROM memory 52 is fed to the expander 54 capable of expanding the four digit word into a six digit word following an input-output continuous characteristic as illustrated in the following table:

TABLE 3

| COMPRESSED WORD | LINEAR WORD |
|---|---|
| 1 1 w x | 1 w x 1 0 0 |
| 1 0 w x | 0 1 w x 1 0 |
| 0 1 w x | 0 0 1 w x 1 |
| 0 0 w x | 0 0 0 w x 1 |

The expander 54 includes a step-down counter 56, a shift register 58 and an output register 60. In addition, an OR gate G8 is adapted to detect the first two digits of the word appearing at the output of ROM memory 52 and an AND gate G9 is responsive to the step-down counter 56 and connected to the shift register 58.

If the word belongs to the first line segment, digit 00 will be placed in the step-down counter 56 and a digit 0 will be fed in the third slot of the shift register 58 through OR gate G8. AND gate G9 which is connected to the step-down counter will be a non-conductive and the clock pulses will have no effect on the shift register 58. Consequently, since a digit 0 is placed in slots 1 and 2 of the register and a digit 1 in the last slot, word 000*wx*1 will be fed to output register 60 through gate 62. The sign is transferred directly to the output register through gate 64.

If a word belonging to the second straight line segment (01*wx*) is fed to the shift register, digits 01 will be registered in the step-down counter 56 and AND gate G9 will be blocked. Consequently, the shift register will not move. On the other hand, digit 1 will be stored into the third slot of the shift register 58 so that word 001*wx*1 will appear at the output of shift register 60 as illustrated in the above table 3.

If a word of the third straight line segment (10*wx*) appears at the output of ROM memory 52, digits 10 will be fed to step-down counter 56 and AND gate G9 will become conductive. In addition, a digit 1 will be stored into the third slot of the shift register 58 through OR gate G8. Upon the appearance of the first clock pulse, the shift register will shift once to the left and the step-down counter will switch to 01 blocking AND gate G9 and rendering the other clock pulses ineffective. The word stored in output register 60 will thus be 01*wx*10 (0 being fed to the last slot of the register during the shift).

If the code appearing at the output of the ROM memory belongs to the fourth line segment (11*wx*), digits 11 will be fed to step-down counter 56 to render AND gate G9 conductive. In addition, a digit 1 will be stored into the third slot of shift register 58. Upon the appearance of the first clock pulse, the shift register will shift to the left once to read 01*wx*10. The counter will read 10 and AND gate G9 will still be conductive. Upon the appearance of the second clock pulse, the shift register will shift again to the left. The step-down counter will thus read 01 and gate G9 will be blocked. The code 1wx100 will therefore be stored in output register 60.

In the same manner as for the compression, any expansion law having an input-output discontinuous characteristic may be used such as, for example, the law $\mu = 255$ or the law $\mu A = 87.6$. FIG. 5 illustrates an expander for the law $\mu = 100$ using the law $\mu = 255$ with 15 segments as an intermediate step in the conversion. Such an expander is designed to expand a word which has been compressed using the compressor of FIG. 3. The six digits representing the amplitude of the word stored into an input register 70 are fed to a ROM memory 72 which converts such word into a seven digit word. The memory thus requires $2^6$ or 64 memory units capable of storing seven digits. The output of the ROM memory 72 is fed to an expander 74 capable of expanding a seven digit word into a thirteen digit word following an input-output discontinuous characteristic as illustrated in the following table 4:

TABLE 4

| COMPRESSED WORD | LINEAR WORD |
|---|---|
| 1 1 1 w x y z | 1 w x y z 0 0 0 0 0 0 0 |
| 1 1 0 w x y z | 0 1 w x y z 0 0 0 0 0 0 |
| 1 0 1 w x y z | 0 0 1 w x y z 0 0 0 0 0 |
| 1 0 0 w x y z | 0 0 0 1 w x y z 0 0 0 0 |
| 0 1 1 w x y z | 0 0 0 0 1 w x y z 0 0 0 |
| 0 1 0 w x y z | 0 0 0 0 0 1 w x y z 0 0 |
| 0 0 1 w x y z | 0 0 0 0 0 0 1 w x y z 0 |
| 0 0 0 w x y z | 0 0 0 0 0 0 0 1 w x y 1 |

The expander 74 of FIG. 5 includes step-down counter 76, shift register 78, output register 80, OR gate G10, and AND gate G11. The circuit of FIG. 5 operates as follows:

The first digit OOO of the word OOO *w x y z* belonging to the first straight line segment will be fed to step-down counter 76 while the last four digits *w x y z* will be fed to the slots 9, 10, 11, 12 of the shift register 78. Slots 1 to 7 of the shift register 78 are fed with digits 0 while slots 8 and 13 are fed with digit 1.

Since the output of OR gate G10 is 0, AND gate G11 will not conduct upon the appearance of the clock pulses and the shift register 78 will not move. Consequently, the output of the shift register will be 00000001 *w x y z* 1 and such will be fed to the output register 80.

If a word belonging to the second straight line segment (001 *w x y z*) appears at the output of ROM memory 72, step-counter 76 will store the value 001 and render AND gate G11 conductive upon the appearance of the first clock pulse. The shift register 78 will only shift once before OR gate G10 renders AND gate G11 non-conductive. Consequently, the output of the shift register will be 0000001 *w x y z* 10. It is to be noted that the shift register shifts to the left and that a digit 0 is inserted in the thirteen slots thereof in place of digit 1 during shifting.

If the above procedure is repeated, it will be noted that the words belonging to the other straight line segments will be converted in accordance with the above table 4.

The quality of the compressor or of the expander must be judged by the percentage of distortion created in the original signal. To evaluate such distortion, the behavior of the present compressor-expander has been compared with that of an ideal compressor-expander using the logarithmic law $\mu = 0$. FIGS. 6 and 7 illustrae the signal to noise ratios obtained when a signal of 1,080 Hz of increasing amplitude is coded and decoded. In FIG. 6, curves 1 to 5 have been obtained using the following combinations:

| CODING | DECODING |
|---|---|
| 1. $\mu$100 | $\mu$100 |
| 2. $\mu$100 | $\mu$100 + A(8) |
| 3. $\mu$100 | $\mu$100 + $\mu$255 (8) |
| 4. $\mu$100 | $\mu$100 + A (7) |
| 5. $\mu$100 | $\mu$100 + $\mu$255 (7) |

FIG. 7 illustrates the signal to noise ratio vs amplitude obtained using the following combinations:

| CODING | DECODING |
|---|---|
| 1. $\mu$100 | $\mu$100 |
| 2. $\mu$255 (8) + $\mu$100 | $\mu$100 |
| 3. A (8) + $\mu$100 | $\mu$100 |
| 4. $\mu$255 (7) + $\mu$100 | $\mu$100 |
| 5. A (7) + $\mu$100 | $\mu$100 |

It will be noted that curve 1 illustrates the signal to noise ratio obtained with law $\mu = 100$ both for coding and decoding. Curves 2 to 5 of FIG. 6 illustrate the case where $\mu = 100$ is used for coding whereas various combinations of the input-output discontinuous laws $A = 87.6$ and $\mu = 255$ with seven or eight digits are used in combination with the law $\mu = 100$. In FIG. 7, various combinations of the laws $\mu = 255$ and $\mu = 87.6$ with seven or eight digits are used for coding whereas the law $\mu = 100$ is used for decoding. It will be noted that curves 2 to 5 are very close to the ideal curve 1 and may be used with advantage for reproducing the law $\mu = 100$ due to the fact that the circuits used for realizing the law $\mu = 100$ are very simple.

We claim:

1. A compressor for converting m digit coded signals into *n* digit coded signals wherein $n < m$, according to a desired input-output continuous characteristic, comprising:

a. first means for converting said m digit coded signals into *p* digit coded signals, $p < m$, so that when the corresponding analog values *x* of said *m* digit coded signals are plotted on the X axis and the corresponding analog values *y* of said *p* digit coded signals plotted on the Y axis of a Cartesian coordinate system, they produce an input-output discontinuous characteristic composed of a plurality of successive straight line segments of different slopes; and b. second means connected to said first means for converting said *p* digit coded signals into said n digit coded signals according to the desired input-output continuous characteristic.

2. A compressor as defined in claim 1, further comprising an input register for storing said m digit coded signals, an output register for storing said n digit coded signals, and wherein said first means includes a shift register, gate means for transferring said *m* digit coded signals stored in said input register into said shift register, means for detecting the most significant digits of said *m* digit coded signals which are indicative of the line segment to which said m digit coded signals belong, and means for isolating the less significant digits of highest order which are indicative of the point on said line segment corresponding approximately to said $m$ digit coded signals, and a counter responsive to said detecting means for identifying said line segment, said most significant digits and said less significant digits of highest order being transferred into said second means.

3. A compressor as defined in claim 2, comprising a clock for generating a number of pulses which are applied to said shift register and to said counter, the number of pulses applied to said counter being determined by said detecting means and said pulses controlling the shifting of the shift register for isolating the less significant digits of highest order.

4. A compressor as defined in claim 1, wherein the compressor is of the PCM type and wherein the desired input-output characteristic is a continuous logarithmic function described by:

$$f(x) = y = ln\ (1 + \mu x)/ln\ (1 + \mu)$$

5. A compressor as defined in claim 4, wherein $\mu =$ 100.

6. A compressor as defined in claim 5, wherein the input-output discontinuous characteristic used in the first means is the one following the law $\mu = 255$ with no less than seven and no more than eight digits and 15 segments.

7. A compressor as defined in claim 5, wherein the input-output discontinuous characteristic is the one following the law $A = 87.6$ with eight digits and thirteen segments.

8. A compressor as defined in claim 1, wherein the second means is a memory capable of providing a fixed predetermined output for a predetermined input.

9. A compressor as defined in claim 8, wherein said memory is a read only memory (ROM).

10. An expander for converting an digit coded signal into a m digit coded signal, $n < m$ comprising:

a. first means for converting the $n$ digit coded signals into $p$ digit coded signals according to a desired input-output continuous characteristic;

b. second means for converting said $p$ digit coded signal into said $m$ digit coded signals so that when the corresponding analog values $x$ of said $p$ digit coded signals are plotted on the X axis and the corresponding analog values y of said $m$ digit coded signals plotted on the Y axis of a Cartesian coordinate system, they produce an input-output discontinuous characteristic composed of a plurality of successive line segments of different slopes.

11. An expander as defined in claim 10, further comprising an input register for storing said $p$ digit coded signals and an output register for storing said $m$ digit coded signals, and wherein said second means include a shift register, means for detecting the most significant digits of said $p$ digit coded signals which are indicative of the line segment to which said $p$ digit coded signals belong, and means for isolating the less significant digits of highest order which are indicative of the point on said line segment corresponding approximately to said $p$ digit coded signals, a counter for registering the most significant digits of said $p$ digit coded signals and means responsive to said counter for controlling said shift register so as to providesaid $m$ digit coded signals.

12. An expander as defined in claim 11, comprising a clock for generating a number of pulses which are applied to said shift register and to said counter, the number of pulses applied to said shift register determining the output value of said $m$ digit coded signals.

13. An expander as defined in claim 10, wherein the expander is of the PCM type and wherein the desired input-output characteristic is a continuous logarithmic function described by:

$$f(x) = y = ln\ (1 + \mu x)/ln\ (1 + \mu)$$

14. An expander as defined in claim 13, wherein $\mu =$ 100.

15. An expander as defined in claim 14, wherein the input-output discontinuous characteristic of the second means is of type $\mu = 255$ with no less than 7 and no more than 8 bits and fifteen segments.

16. An expander as defined in claim 14, wherein the input-output discontinuous characteristic of the second means is the one following the law $A = 87.6$ with eight bits and thirteen segments.

17. An expander as defined in claim 10, wherein the first means is a memory capable of providing a fixed predetermined output for a predetermined input.

18. An expander as defined in claim 17, wherein said memory is a read only memory (ROM).

* * * * *